(Model.)
A. ROBINSON.
DENTAL PLATE.
No. 343,967. Patented June 15, 1886.
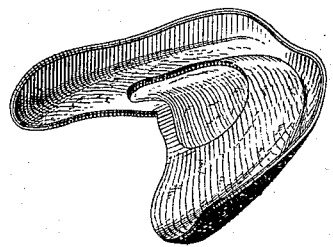
Witnesses:
Inventor:
Albert Robinson

UNITED STATES PATENT OFFICE.

ALBERT ROBINSON, OF GRAND RAPIDS, MICHIGAN.

DENTAL PLATE.

SPECIFICATION forming part of Letters Patent No. 343,967, dated June 15, 1886.

Application filed February 27, 1885. Serial No. 157,269. (Model.)

*To all whom it may concern:*

Be it known that I, ALBERT ROBINSON, a citizen of the United States, residing at the city of Grand Rapids, in the county of Kent and State of Michigan, have invented a new and useful Improvement in Dental Plates, of which the following is a specification.

My invention relates to improvements in dental plates which are composed of a plastic material—such as vulcanized rubber faced or lined with metal—and is, in fact, the ordinary rubber plate neatly and completely lined or covered with gold, thus supplying a want long felt in the dental profession of a safe and sure substitute for gold plates, being something that will not corrode, yet be durable, not expensive, yet elegant and wholesome, combining, as it does, all the good qualities of a gold plate, and yet avoiding those objections which are inseparably connected with a dental plate composed entirely of gold or rubber.

The figure shows a plan view of a plate of teeth made after my improvement.

I am aware that Patent No. 263,588 has been granted to Jeremiah A. Robinson, of Jackson, Michigan, for a dental plate composed of plastic material, in combination with a facing or surface formed of fine metal filaments, known as "felt-foil," and consequently do not claim the same.

My invention embraces a metal-lined dental plate made as hereinafter stated. I accomplish the result aimed at in the specification of the above patent, but in a different manner, making a dental plate with a lining of gold, which will neither wear nor peel off, the object of my invention being to furnish a dental plate which will avoid the injury produced by rubber plates, and yet make a much cheaper and better plate than those made entirely of gold. I accomplish this object in the following manner: After taking a cast of the mouth in the usual manner, I then invest the cast in the flask in the ordinary way. Then open the flask and remove the wax. Then pack rubber in the upper half of flask containing the teeth. Then take a piece of cloth and place it upon the cast, heat and press the flask together. The object of the cloth is to keep the stain of rubber from off the cast. It is not absolutely necessary to use any cloth, but I do so for convenience. After the flask is pressed tightly together open it while yet warm and remove the cloth, if one has been used. Then place pieces of gold (I use what is known as "sponge-gold," which is gold deposited by electrolysis in the form of very fine sponge, and cut into thin uniform slices from the block or mass) on the rubber, allowing the edges to lap, and then press them down carefully with the fingers into the depressions, being careful that the whole surface of the rubber is covered. Then close the flask and press tightly together and vulcanize. The rubber becomes soft during the heating process, and the pores of the sponge-gold are filled, so that after vulcanization or hardening of the rubber takes place the gold is firmly attached to it and cannot be removed or separated therefrom. I also use in the same manner a preparation called "metallized-rubber compound," (which is sponge or crystal gold saturated with rubber dissolved with any of its solvents,) which produces the same or similar results.

What I claim as my invention, and wish to secure by Letters Patent, is—

1. The process herein described of making dental plates, consisting, first, in preparing a vulcanite plate in the flask in the ordinary manner, ready for vulcanizing; second, after opening the flask applying sponge-gold to the surface of the plate; third, closing tightly the flask; and, lastly, vulcanizing, whereby the said sponge-gold becomes thoroughly incorporated with the vulcanized plate, substantially as described.

2. A dental plate composed of a vulcanite base, in combination with sponge-gold thoroughly incorporated therewith, substantially as described.

ALBERT ROBINSON.

Witnesses:
 EDWARD W. WITHEY,
 THADDEUS FOOTE.